United States Patent
Funada et al.

(10) Patent No.: US 10,103,814 B2
(45) Date of Patent: Oct. 16, 2018

(54) DATA RECEIVING APPARATUS

(71) Applicant: SUMITOMO ELECTRIC INDUSTRIES, LTD., Osaka-shi, Osaka (JP)

(72) Inventors: Tomoyuki Funada, Osaka (JP); Daisuke Umeda, Osaka (JP); Naruto Tanaka, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/554,873

(22) PCT Filed: Nov. 25, 2015

(86) PCT No.: PCT/JP2015/083041
§ 371 (c)(1),
(2) Date: Aug. 31, 2017

(87) PCT Pub. No.: WO2016/139851
PCT Pub. Date: Sep. 9, 2016

(65) Prior Publication Data
US 2018/0041278 A1  Feb. 8, 2018

(30) Foreign Application Priority Data
Mar. 4, 2015 (JP) ................. 2015-042192

(51) Int. Cl.
*H04B 10/27* (2013.01)
*H04B 10/293* (2013.01)
(Continued)

(52) U.S. Cl.
CPC ....... *H04B 10/2939* (2013.01); *H04B 10/272* (2013.01); *H04B 10/67* (2013.01); *H04L 12/46* (2013.01); *H04L 45/02* (2013.01)

(58) Field of Classification Search
CPC ... H04B 10/2939; H04B 10/272; H04B 10/67
See application file for complete search history.

(56) References Cited

U.S. PATENT DOCUMENTS 8,238,753 B2 * 8/2012 Hamano ............. H04J 14/0226
398/100
2008/0019693 A1 * 1/2008 Sorin ................. H04Q 11/0067
398/71
(Continued)

FOREIGN PATENT DOCUMENTS

JP  2010-252044 A  11/2010

*Primary Examiner* — Dzung Tran
(74) *Attorney, Agent, or Firm* — Drinker Biddle & Reath LLP (57) ABSTRACT

A configuration for receiving transmission data at multiple rates where one rate is not necessarily a multiple of another is provided. A host board includes a receiving circuit, a cross point switch, and a switch control circuit. The receiving circuit includes a receiving unit configured to receive a first data signal transmitted at a first rate, and a second receiving unit configured to receive a second data signal transmitted at a second rate different from the first rate. The cross point switch includes input terminals and output terminals. The cross point switch is configured to define a path of signal between the input terminals and the output terminals to route an input data signal to at least one of the first receiving unit and the second receiving unit.

16 Claims, 6 Drawing Sheets

(51) Int. Cl.
    *H04B 10/67*     (2013.01)
    *H04L 12/751*     (2013.01)
    *H04L 12/46*     (2006.01)
    *H04B 10/272*     (2013.01)

(56) References Cited

U.S. PATENT DOCUMENTS

| | | | | |
|---|---|---|---|---|
| 2009/0245790 A1* | 10/2009 | Mizutani | ............... | H04J 3/0682 |
| | | | | 398/43 |
| 2009/0297162 A1* | 12/2009 | Kai | ............... | H04J 3/1694 |
| | | | | 398/135 |
| 2015/0311997 A1* | 10/2015 | Boyd | ............... | H04Q 11/0067 |
| | | | | 398/68 |
| 2017/0064418 A1* | 3/2017 | Tao | ............... | H04B 10/27 |

\* cited by examiner

DATA RECEIVING APPARATUS

TECHNICAL FIELD

The present invention relates to an apparatus for receiving data transmitted at a plurality of transmission rates (multiple rates).

BACKGROUND ART

A passive optical network (PON) system is a kind of optical communications system. A PON system includes an optical line terminal (OLT), one or more optical network units (ONUs), an optical fiber to transmit an optical signal, and an optical splitter to allow the optical fiber to branch. The OLT is connected to the ONUs with the optical fiber and the optical splitter. The optical splitter is installed between the OLT and the ONUs. In this way, a plurality of optical network units can be connected to one optical line terminal.

The IEEE 802.3 standard prescribes the GE-PON and the 10G-EPON as standards of the PON. One of the differences between the GE-PON and the 10G-EPON is a transmission rate of data. The transmission rate of the GE-PON is 1.25 Gbps (bit per second). The transmission rate of the 10G-EPON is 10.3125 Gbps.

One PON system may include both the GE-PON and the 10G-EPON. An example of such a system is disclosed in Japanese Patent Laying-Open No. 2010-252044 (PTD 1).

CITATION LIST

Patent Document

PTD 1: Japanese Patent Laying-Open No. 2010-252044

SUMMARY OF INVENTION

Technical Problem

Japanese Patent Laying-Open No. 2010-252044 does not disclose a configuration for an OLT to receive data sent at a plurality of different transmission rates (multiple rates). An object of the present invention is to provide a configuration for receiving transmission data at multiple rates where one rate is not necessarily a multiple of another.

Solution to Problem

A data receiving apparatus according to an embodiment of the present invention includes: a data receiving circuit including a first receiving unit configured to receive a first data signal transmitted at a first rate, and a second receiving unit configured to receive a second data signal transmitted at a second rate different from the first rate; and a path switch including first and second input terminals and first and second output terminals, the path switch being configured to define a path of signal between at least one of the first and second input terminals and at least one of the first and second output terminals to route an input data signal to at least one of the first receiving unit and the second receiving unit.

Advantageous Effects of Invention

According to the above, a configuration for receiving transmission data at multiple rates where one rate is not necessarily a multiple of another can be implemented.

DESCRIPTION OF EMBODIMENTS

Description of Embodiments of Invention

First, embodiments of the present invention are enumerated. In the following description, the term "terminal" can be replaced with the term "port". The terms "first" and "second" are used to distinguish a plurality of identical or similar components from one another and are not intended to specify the order of the components.

(1) A data receiving apparatus according to an embodiment of the present invention includes: a data receiving circuit including a first receiving unit configured to receive a first data signal transmitted at a first rate, and a second receiving unit configured to receive a second data signal transmitted at a second rate different from the first rate; and a path switch including first and second input terminals and first and second output terminals, the path switch being configured to define a path of signal between at least one of the first and second input terminals and at least one of the first and second output terminals to route an input data signal to at least one of the first receiving unit and the second receiving unit.

According to such a configuration, the path switch can sort data signals into the first receiving unit and the second receiving unit. Thus, a configuration for receiving transmission data at multiple rates where one rate is not necessarily a multiple of another can be implemented.

(2) Preferably, the data receiving apparatus further includes a control circuit configured to control the path in the path switch. The first output terminal is a terminal to output the first data signal to the first receiving unit. The second output terminal is a terminal to output the second data signal to the second receiving unit. The control circuit is configured to control the path in the path switch in accordance with a mode selected from among a first mode, a second mode, and a third mode. The first mode is a mode in which the first input terminal and the first output terminal are connected to each other and in which the second input terminal and the second output terminal are connected to each other. The second mode is a mode in which any one of the first and second input terminals is connected to the first and second output terminals switchably. The third mode is a mode in which any one of the first and second input terminals is connected to the first and second output terminals.

According to such a configuration, the control circuit can appropriately control a path within the path switch in accordance with a data signal input to at least one of the first and second input terminals of the path switch.

(3) Preferably, the path in the path switch is set so that a terminal, among the first and second input terminals, receiving input of the data signal is connected to the first and second output terminals. The data receiving apparatus further includes a rate determining unit configured to determine a rate of transmission of the data signal based on whether or not the data signal has been successfully received by at least one of the first receiving unit and the second receiving unit.

According to such a configuration, a path within the path switch can be appropriately controlled based on a determination result from the rate determining unit.

(4) Preferably, the path in the path switch is controlled so that a terminal, among the first and second input terminals, receiving input of the data signal is connected to the first and second output terminals switchably. The data receiving apparatus further includes a rate determining unit configured to determine a rate of transmission of the data signal based on whether or not the data signal has been successfully received by at least one of the first receiving unit and the second receiving unit.

According to such a configuration, a path within the path switch can be appropriately controlled based on a determination result from the rate determining unit.

(5) Preferably, the data receiving apparatus is included in an optical line terminal of an optical communications system.

According to such a configuration, an OLT for appropriately receiving transmission data at multiple rates where one rate is not necessarily a multiple of another can be implemented.

Details of Embodiments of Invention

Embodiments of the present invention are described below with reference to the drawings. In the drawings, identical or corresponding components are identically denoted and explanations for such components are not repeated.

Figure 1:
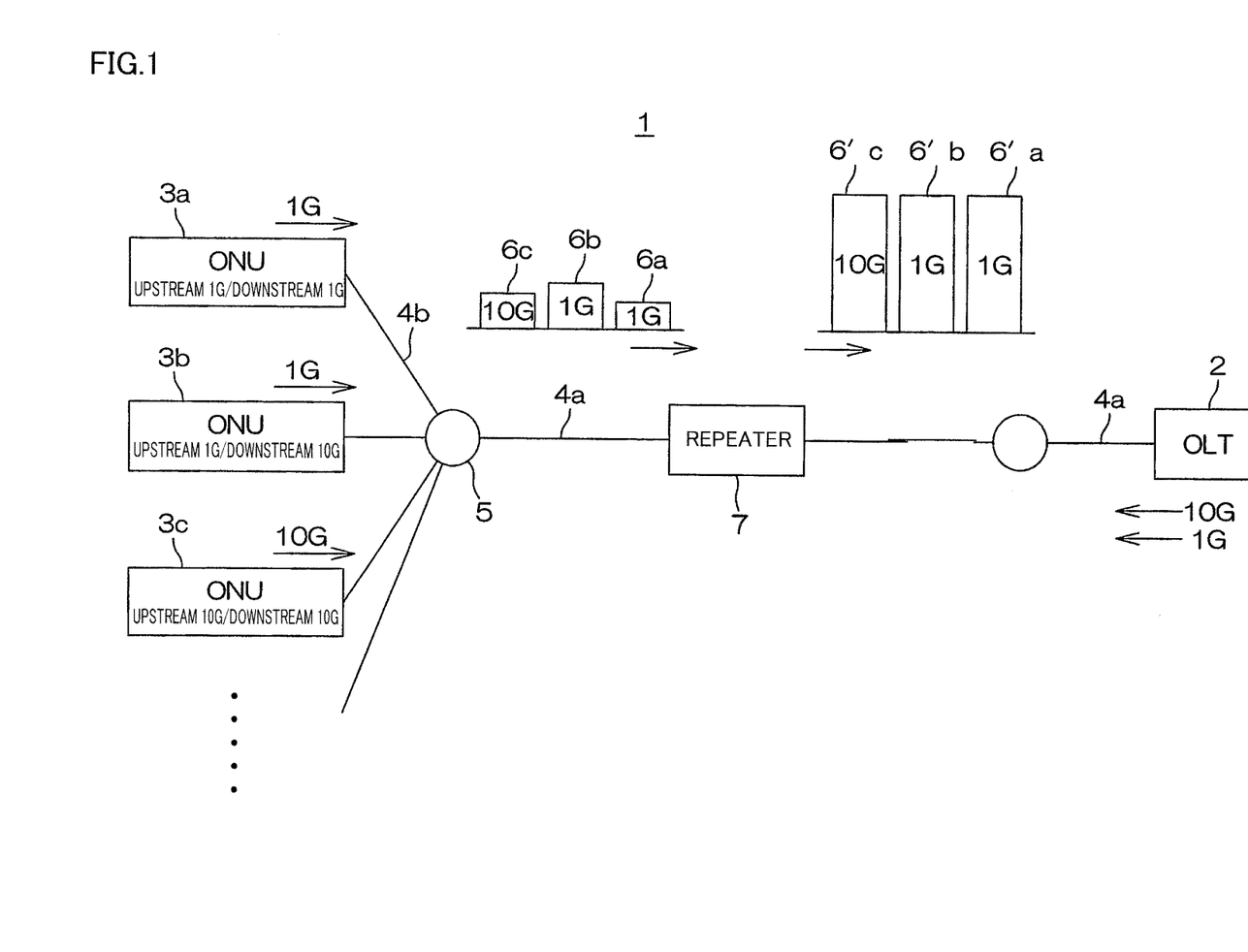
FIG. 1 is a schematic diagram showing an example configuration of an optical communications system according to an embodiment of the present invention.

FIG. 1 is a schematic diagram showing an example configuration of an optical communications system 1 according to an embodiment of the present invention. With reference to FIG. 1, optical communications system 1 includes an optical line terminal 2, a plurality of optical network units 3a, 3b, 3c, ..., a trunk line optical fiber 4a, a plurality of leaf line optical fibers 4b, an optical coupler 5, and an optical signal repeater 7. The optical line terminal is hereinafter referred to as an "OLT", and the optical network units are hereinafter referred to as "ONUs". Each of ONUs 3a, 3b, 3c is installed in a subscriber's place. Trunk line optical fiber 4a is connected to OLT 2. Each leaf line optical fiber 4b is connected to a corresponding ONU. Optical coupler 5 connects trunk line optical fiber 4a with a plurality of leaf line optical fibers 4b. Optical signal repeater 7 is disposed in the middle of trunk line optical fiber 4a.

Optical communications system 1 forms a system including the GE-PON and the 10G-EPON. The GE-PON has a communication speed (transmission rate) of 1.25 Gbps. The 10G-EPON has a communication speed (transmission rate) of 10.3125 Gbps. A signal at a transmission rate of 1.25 Gbps is hereinafter also referred to as a "1G signal". On the other hand, a signal at a transmission rate of 10.3125 Gbps is hereinafter also referred to as a "10G signal".

OLT 2 can receive both an upstream signal of the GE-PON and an upstream signal of the 10G-EPON. That is, OLT 2 is configured to be capable of receiving data sent at a plurality of different rates. Further, OLT 2 can send both a downstream signal of the GE-PON and a downstream signal of the 10G-EPON.

Each of ONUs 3a, 3b, 3c is a unit for a subscriber to enjoy an optical network service. Each ONU sends an upstream signal. The upstream signal has a communication speed of either 1.25 Gbps or 10.3125 Gbps. Each ONU receives a downstream signal. The downstream signal has a communication speed of either 1.25 Gbps or 10.3125 Gbps. As shown in FIG. 1, communication speeds of upstream and downstream signals of each ONU are any one of four combinations.

Optical coupler 5 is connected to trunk line optical fiber 4a and a plurality of leaf line optical fibers 4b. Optical coupler 5 distributes an optical signal sent through trunk line optical fiber 4a to a plurality of leaf line optical fibers 4b. Further, optical coupler 5 multiplexes optical signals sent from a plurality of leaf line optical fibers 4b and delivers them to trunk line optical fiber 4a. Optical coupler 5 can include, for example, an optical star coupler.

OLT 2 and each of ONUs 3a, 3b, 3c communicate with each other in units of variable-length frames.

Now, the sending of an upstream signal by each ONU is described. A terminal device of each subscriber's place sends data. The data is converted into an optical burst signal by an ONU. The optical burst signal is composed of bits. If the sending rate of the ONU conforms to the GE-PON, the bit transmission rate is 1.25 Gbps. On the other hand, if the sending rate of the ONU conforms to the 10G-EPON, the bit transmission rate is 10.3125 Gbps.

ONU 3a sends an optical burst signal 6a. ONU 3b sends an optical burst signal 6b. ONU 3c sends an optical burst signal 6c. The transmission rates of optical burst signals 6a, 6b are both 1.25 Gbps. The transmission rate of optical burst signal 6c is 10.3125 Gbps.

Optical coupler 5 multiplexes optical burst signals 6a, 6b, 6c and outputs an optical signal to trunk line optical fiber 4a. The optical signal from optical coupler 5 is sent to OLT 2 through optical signal repeater 7.

OLT 2 sends a control frame to each of ONUs 3a, 3b, 3c. The control frame allocates a time window to each of ONUs 3a, 3b, 3c for sending an upstream optical signal. Therefore, optical burst signals 6a-6c do not conflict with one another on a time axis. OLT 2 obtains a transmission rate and a reception timing of an optical burst signal to be received by allocating a time window to each of ONUs 3a, 3b, 3c.

Optical signal repeater 7 is a device to repeat an optical signal. Optical signal repeater 7 can increase a transmission distance of an optical signal, i.e., a distance between the OLT and the ONUs.

Upon receiving an optical signal, optical signal repeater 7 converts the optical signal into an electrical signal. Optical signal repeater 7 performs various kinds of processing to the electrical signal. Optical signal repeater 7 then converts the electrical signal into an optical signal and delivers the optical signal.

Upon receiving an optical signal, optical signal repeater 7 shapes the waveform of the signal. Further, optical signal repeater 7 equalizes strengths of a plurality of optical signals to be output. Optical burst signals 6′a, 6′b, 6′c are substantially the same in strength. Optical signal repeater 7 generates optical signals to be output based on a plurality of optical burst signals so that signals corresponding to a plurality of pieces of data are the same in level.

Figure 2:
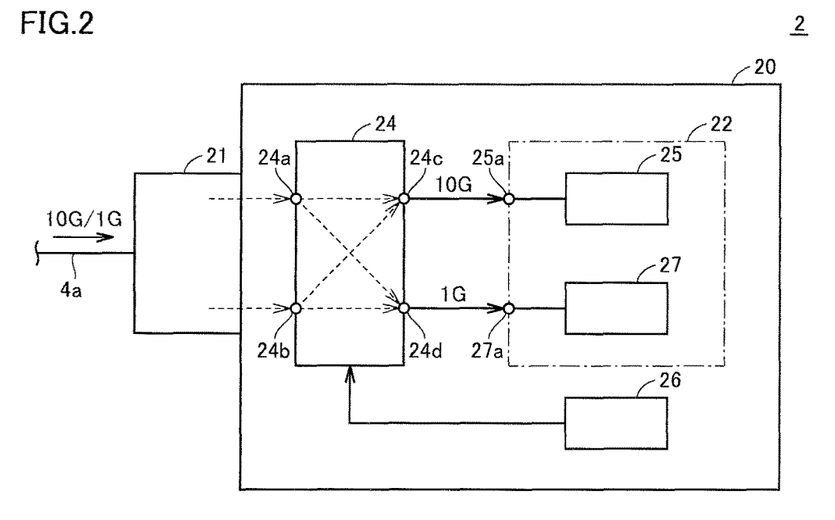
FIG. 2 is a block diagram showing a part of a configuration of an OLT according to an embodiment of the present invention.

FIG. 2 is a block diagram showing a part of a configuration of OLT 2 according to an embodiment of the present invention. A part of the configuration of OLT 2 responsible for reception of an optical signal is shown in FIG. 2. That is, a data receiving apparatus according to an embodiment of the present invention is disclosed in FIG. 2. OLT 2 includes a host board 20 and an optical transceiver 21. Host board 20 includes a receiving circuit 22, a cross point switch (path switch) 24, and a switch control circuit 26.

Receiving circuit 22 receives both a data signal (1G signal) transmitted at 1.25 Gbps and a data signal (10G signal) transmitted at 10.3125 Gbps. Receiving circuit 22 includes an input terminal 25a, an input terminal 27a, a 10G signal receiving unit 25, and a 1G signal receiving unit 27. Input terminal 25a receives a 10G signal. Input terminal 27a receives a 1G signal. 10G signal receiving unit 25 receives a 10G signal through input terminal 25a. 1G signal receiving unit 27 receives a 1G signal through input terminal 27a.

10G signal receiving unit 25 is a dedicated circuit for the 10G-EPON. 1G signal receiving unit 27 is a dedicated circuit for the GE-PON. 10G signal receiving unit 25 cannot receive a 1G signal, i.e., a data signal of the GE-PON. 1G signal receiving unit 27 cannot receive a 10G signal. The term "cannot receive" may include a state of the receiving circuit where an error is generated upon receiving a data signal. In an embodiment, receiving circuit 22 can be implemented as a PON-PMA (physical media attachment).

Cross point switch 24 includes input terminals 24a, 24b and output terminals 24c, 24d. Cross point switch 24 defines a signal path between input terminals 24a, 24b and output terminals 24c, 24d. Cross point switch 24 routes an input data signal to at least one of 10G signal receiving unit 25 and 1G signal receiving unit 27. Cross point switch 24 is configured to select a signal path from among a path connecting one input terminal and one output terminal (1:1), a path connecting one input terminal and two output terminals (1:2), and a path connecting two input terminals and one output terminal (2:1). Cross point switch 24 can sort data signals into 10G signal receiving unit 25 and 1G signal receiving unit 27. Thus, a configuration for receiving transmission data at multiple rates can be implemented.

Switch control circuit 26 controls cross point switch 24. As described in detail later, switch control circuit 26 controls a path in cross point switch 24 in accordance with any of first, second, and third modes. Switch control circuit 26 may be provided outside receiving circuit 22. Alternatively, switch control circuit 26 may be integrated on receiving circuit 22. Receiving circuit 22 and switch control circuit 26 can be implemented by a circuit including a semiconductor integrated circuit. Switch control circuit 26 can appropriately control a path within cross point switch 24 in accordance with a data signal input to at least one of input terminals 25a, 27a of cross point switch 24.

Optical transceiver 21 receives a 1G signal and a 10G signal through trunk line optical fiber 4a. Optical transceiver 21 converts these optical signals into electrical signals and outputs the electrical signals to host board 20.

Figure 3:
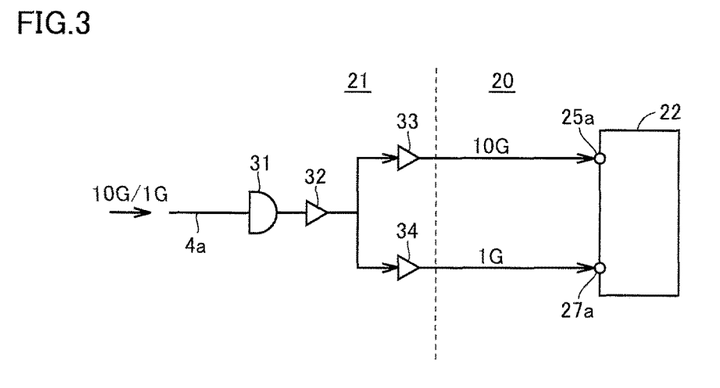
FIG. 3 is a block diagram showing a first example configuration of an optical transceiver.
Figure 4:
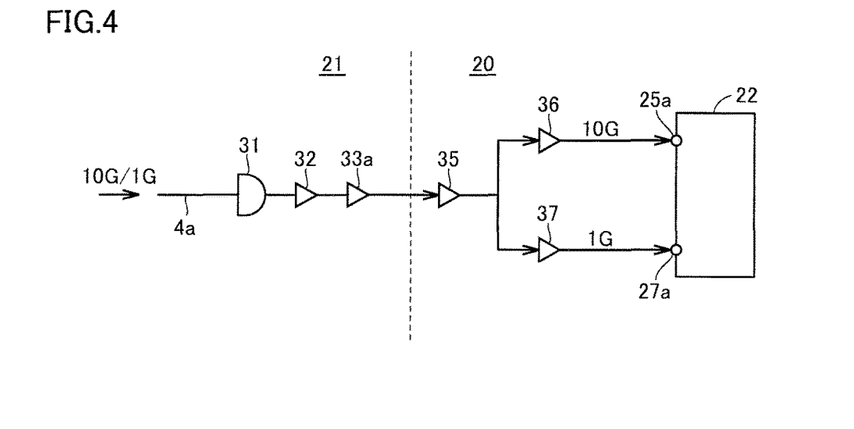
FIG. 4 is a block diagram showing a second example configuration of an optical transceiver.

As configurations of optical transceiver 21, configurations shown in FIGS. 3 and 4 can be implemented. FIG. 3 is a block diagram showing a first example configuration of optical transceiver 21. As shown in FIG. 3, optical transceiver 21 includes an optical receiver 31, a transimpedance amplifier (TIA) 32, and limiting amplifiers (LAs) 33, 34.

Optical receiver 31 is a dual-rate burst mode receiver and converts an optical signal sent through trunk line optical fiber 4a into a current signal. Upon receiving a current signal, TIA 32 performs impedance conversion and amplification to output a voltage signal. Output from TIA 32 is distributed to limiting amplifier 33 and limiting amplifier 34. Limiting amplifier 33 amplifies a 10G signal and outputs it. Limiting amplifier 34 amplifies a 1G signal and outputs it. The signal output from limiting amplifier 33 is input to input terminal 25a of receiving circuit 22. The signal output from limiting amplifier 34 is input to input terminal 27a of receiving circuit 22.

FIG. 4 is a block diagram showing a second example configuration of optical transceiver 21. In the second example configuration, optical transceiver 21 includes optical receiver 31, transimpedance amplifier 32, and a limiting amplifier 33a. Host board 20 is provided with limiting amplifiers 35, 36, 37. Limiting amplifier 35 amplifies a signal output from limiting amplifier 33a. An output signal of limiting amplifier 35 is distributed to limiting amplifiers 36, 37. Limiting amplifier 36 amplifies a 10G signal and outputs it. Limiting amplifier 37 amplifies a 1G signal and outputs it. The signal output from limiting amplifier 36 is input to input terminal 25a of receiving circuit 22. The signal output from limiting amplifier 37 is input to input terminal 27a of receiving circuit 22.

In the configuration shown in FIG. 3, a 10G signal and a 1G signal are distributed in optical transceiver 21. In the configuration shown in FIG. 4, a 10G signal and a 1G signal are distributed at host board 20. In either of the first and second example configurations of the optical transceiver, input terminal 25a of receiving circuit 22 can receive a 10G signal, and input terminal 27a of receiving circuit 22 can receive a 1G signal.

Optical transceiver 21 can detect a burst signal (in other words, can determine presence or absence of a signal) in, for example, the following methods.

OLT 2 sets the operation of optical transceiver 21. In one method, OLT 2 causes optical transceiver 21 to operate while the mode is a broadband mode operable at 10G.

In another method, the operation of optical transceiver 21 is set so that optical transceiver 21 operates in a 1G mode for a section with no signal and operates in a 10G mode for a section with signal. After the end of a burst signal is identified, optical transceiver 21 is set to the 1G mode. After receiving Signal Detect (SD), optical transceiver 21 is set to the 10G mode.

In still another method, optical transceiver 21 is operated at a narrow band and a high gain for 1G signal. When optical transceiver 21 receives SD, optical transceiver 21 determines whether the optical burst signal is a 1G signal or not. If the determination result is "no" (fail), optical transceiver 21 is operated at a broadband and a low gain for 10G signal. For such determination on SD, determination of output of the transimpedance amplifier (determination at the AC level), and determination by a monitored current of a light receiving element (determination at the DC level) are possible.

According to this embodiment, cross point switch 24 can define a signal path in accordance with the configuration of the optical transceiver.

Figure 5:
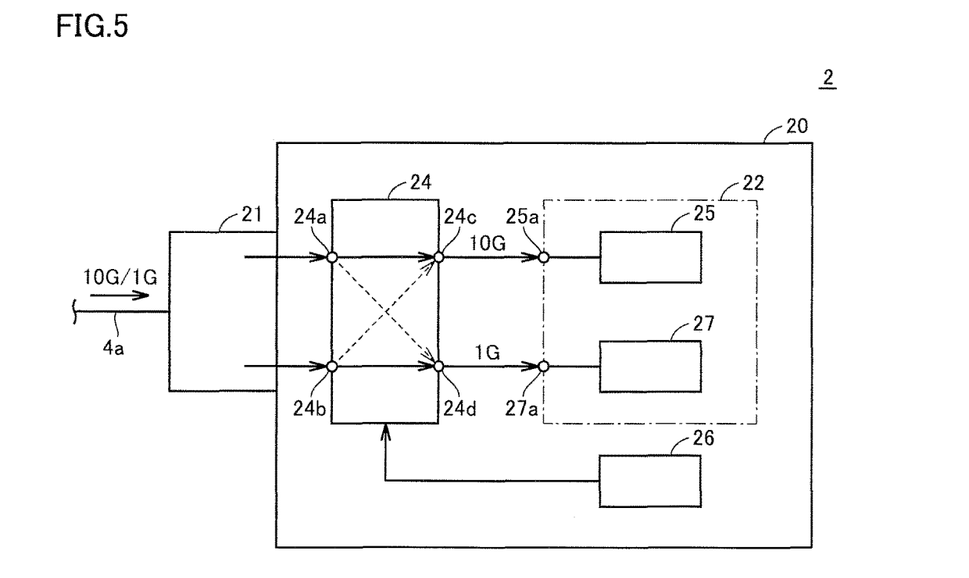
FIG. 5 is a diagram showing a path in a cross point switch defined corresponding to the first example configuration of an optical transceiver.

FIG. 5 is a diagram showing a path in cross point switch 24 defined corresponding to the first example configuration of optical transceiver 21. Switch control circuit 26 controls a path in cross point switch 24 in accordance with a first mode. As shown in FIG. 5, a first path is formed between input terminal 24a and output terminal 24c. A second path is formed between input terminal 24b and output terminal 24d. A 10G signal is transmitted through the first path and sent from output terminal 24c of cross point switch 24 to input terminal 25a of receiving circuit 22. A 1G signal is transmitted through the second path and sent from output terminal 24d of cross point switch 24 to input terminal 27a of receiving circuit 22.

Figure 6:
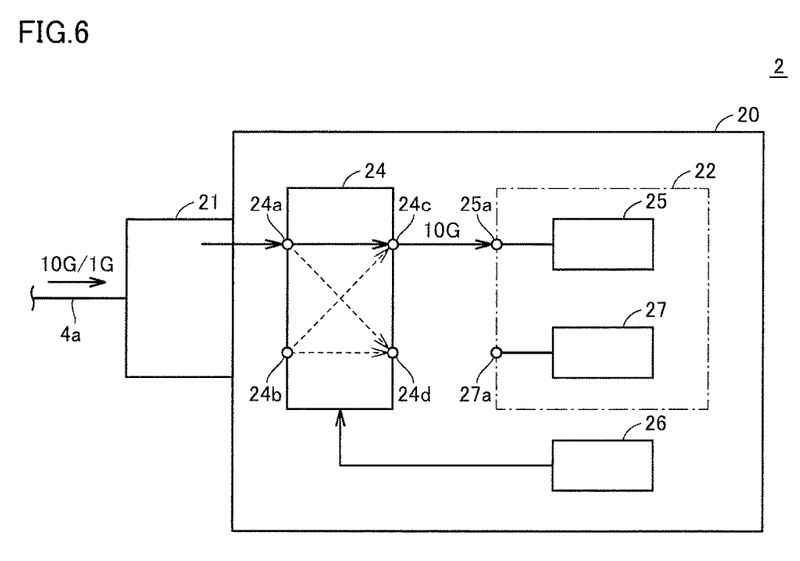
FIG. 6 is a diagram showing a first path in a cross point switch defined corresponding to the second example configuration of an optical transceiver.
Figure 7:
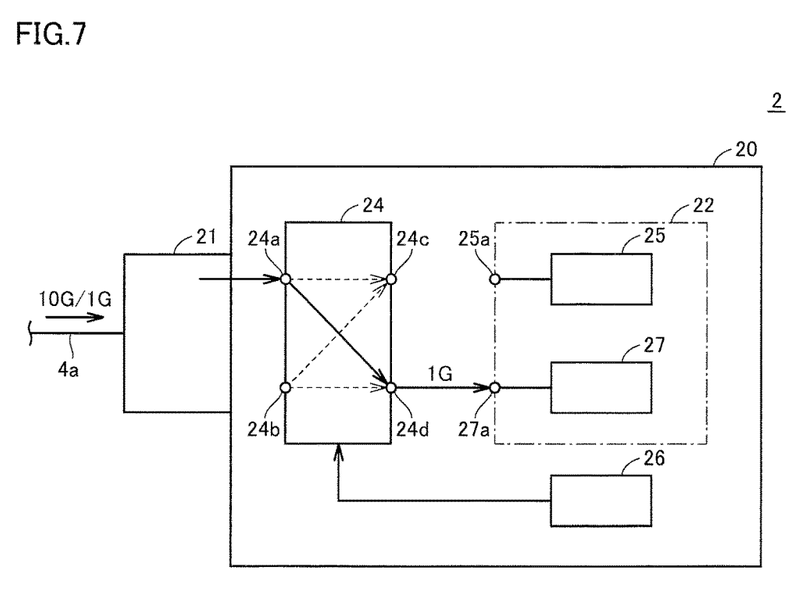
FIG. 7 is a diagram showing a second path in a cross point switch defined corresponding to the second example configuration of an optical transceiver.

FIG. 6 is a diagram showing a first path in cross point switch 24 defined corresponding to the second example configuration of optical transceiver 21. FIG. 7 is a diagram showing a second path in cross point switch 24 defined corresponding to the second example configuration of optical transceiver 21. Switch control circuit 26 controls a path in cross point switch 24 in accordance with a second mode.

As shown in FIG. 6, when a 10G signal is transmitted, a first path is formed between input terminal 24a and output terminal 24c. As shown in FIG. 7, when a 1G signal is transmitted, a second path is formed between input terminal 24a and output terminal 24d.

As described above, OLT 2 obtains a transmission rate and a reception timing of an optical burst signal to be received. Based on the obtained transmission rate and reception timing, switch control circuit 26 switches between the first path shown in FIG. 6 and the second path shown in FIG. 7.

Figure 8:
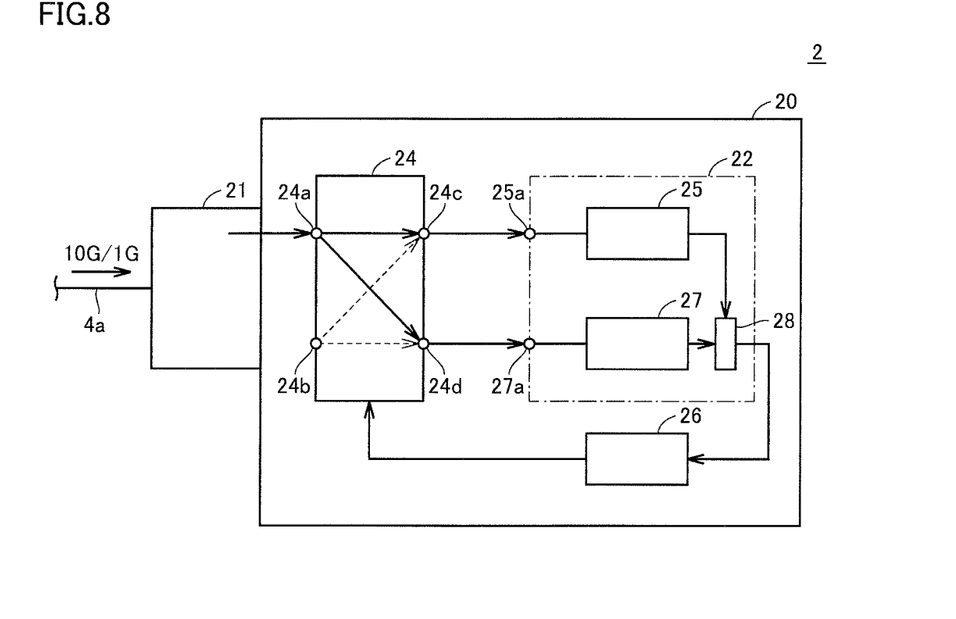
FIG. 8 is a diagram illustrating routing of a signal by a cross point switch according to another embodiment of the present invention.

FIG. 8 is a diagram illustrating routing of a signal by cross point switch 24 according to another embodiment of the present invention. Switch control circuit 26 controls a path in cross point switch 24 in accordance with a third mode.

As shown in FIG. 8, a first path is formed between input terminal 24a and output terminal 24c. Further, a second path is formed between input terminal 24a and output terminal 24d. A path within cross point switch 24 is formed corresponding to the second configuration of optical transceiver 21.

Receiving circuit 22 can further include a rate determining unit 28. Rate determining unit 28 receives a reception result of each of 10G signal receiving unit 25 and 1G signal receiving unit 27. The reception result refers to whether or not a data signal has been successfully received. Base on the reception result, rate determining unit 28 sends, to switch control circuit 26, a signal for setting a path within cross point switch 24. In accordance with the signal, switch control circuit 26 controls cross point switch 24. In this way, any one of the first and second paths shown in FIG. 8 can be selected.

If reception of data signal by 10G signal receiving unit 25 is normal while a result of reception of data signal by 1G signal receiving unit 27 is not normal, rate determining unit 28 determines the transmission rate of data signal to be 10.3125 Gbps. In such a case, rate determining unit 28 sends, to switch control circuit 26, a signal for setting a path in cross point switch 24 to the first path.

On the other hand, if reception of data signal by 10G signal receiving unit 25 is not normal while a result of reception of data signal by 1G signal receiving unit 27 is normal, rate determining unit 28 determines the transmission rate of data signal to be 1.25 Gbps. In such a case, rate determining unit 28 sends, to switch control circuit 26, a signal for setting a path in cross point switch 24 to the second path.

Figure 9:
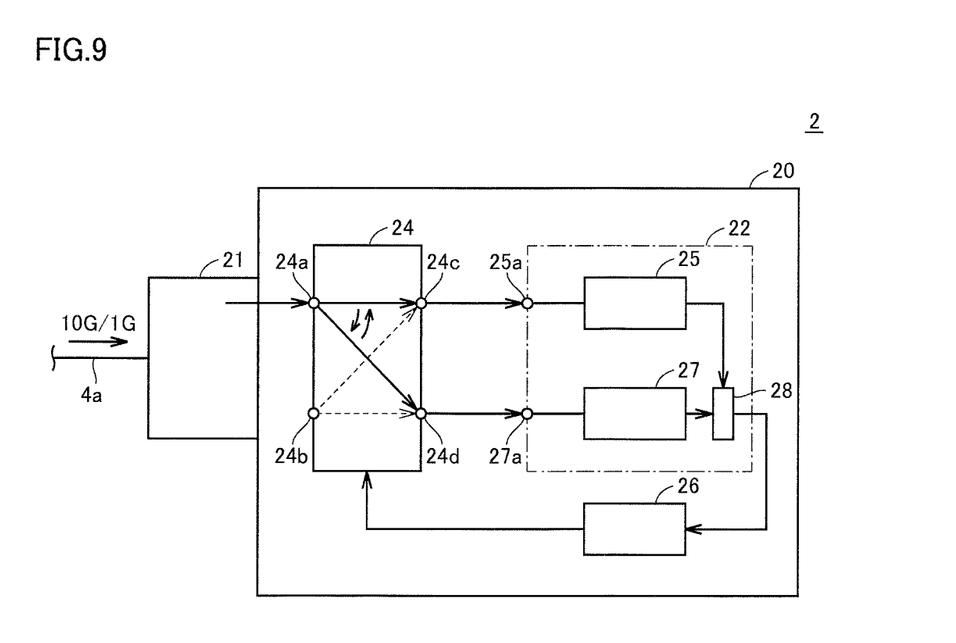
FIG. 9 is a diagram illustrating routing of a signal by a cross point switch according to still another embodiment of the present invention.

The first path and the second path shown in FIG. 8 may be temporally switched. That is, switch control circuit 26 controls a path in cross point switch 24 in accordance with the second mode. As shown in FIG. 9, rate determining unit 28 receives a reception result of each of 10G signal receiving unit 25 and 1G signal receiving unit 27. Based on a processing result of each of 10G signal receiving unit 25 and 1G signal receiving unit 27, rate determining unit 28 can send, to switch control circuit 26, a signal for setting a path within cross point switch 24. According to the configuration shown in FIGS. 8 and 9, a transmission rate of data signal is detected, and a path within cross point switch 24 is set based on the detection result. For example, in the case where OLT 2 is required to obtain a transmission rate of signal sent from an ONU, cross point switch 24 can be controlled as shown in FIGS. 8 and 9.

OLT 2 outputs a discovery gate to discover an ONU connected to the PON line. One of the signals sent from an ONU is a signal for responding to a discovery gate from OLT 2. By setting a signal path in cross point switch 24 as shown in FIG. 8 or 9, a signal responding to a discovery gate can be received at both 10G signal receiving unit 25 and 1G signal receiving unit 27. Although the signal is normally received by one of 10G signal receiving unit 25 and 1G signal receiving unit 27, the signal cannot be normally processed by the other. Based on the reception result of each receiving unit, a path can be selected so that a signal can be sent to an appropriate one of 10G signal receiving unit 25 and 1G signal receiving unit 27.

In each of the embodiments previously described, rate determining unit 28 determines a transmission rate based on a reception result of each of 10G signal receiving unit 25 and 1G signal receiving unit 27. However, according to this embodiment, a transmission rate can be determined based on whether or not reception has been successfully performed by at least one of JOG signal receiving unit 25 and 1G signal receiving unit 27. In the case where one electrical signal is output from receiving circuit 22 (PMD), the signal can be branched into two signals, and a transmission rate can be determined based on the two signals. For example, the following methods can be employed to determine a transmission rate.

In a first method, determination of digital pattern and determination of analog level are performed. Presence or absence of data signal is determined by SD. Then, locking and determination of pattern are performed by 1G signal receiving unit 27. As a result, if an input data signal is not a 1G signal, the data signal is determined to be a 10G signal.

In a second method, determination of clock synchronization is performed. As in the above-described method, presence or absence of signal is determined by SD. Such determination is, however, not essential. Then, a data signal is passed through a CDR circuit for 1G signal and a CDR circuit for 10G signal individually. A transmission rate of a locked one of the two CDR circuits is determined to be a transmission rate of the data signal. For this determination, for example, a control voltage of a voltage-controlled oscillator (VCO) used for locking or a determination result from a frequency comparator can be used.

In a third method, in addition to the second method, determination of digital pattern is performed. Specifically, a data signal is decoded and a transmission rate is determined by the signal pattern. For example, in determining a 10G signal, a section of 10G signal is determined based on a pattern from the start of burst (SOB) to the end of burst (FOB). A signal section different from that of 10G signal is determined to be a section of 1G signal.

In a fourth method, determination at the analog level is performed. For example, one of two signals generated by branching is passed through a low-pass filter (LPF) having a band intermediate between the two transmission rates. The power of the signal passed through the LPF and the power of the signal not passed through the LPF are measured. If there is a difference between these measurement values, the transmission rate of the data signal is determined to be a high rate (10G). On the other hand, if there is no significant difference between the two measurement values, the transmission rate of the data signal is determined to be a low rate (1G). The start and the end of this determination can be determined using an SD determination signal of the PMD as a trigger.

Rate determining unit 28 may be integrated with switch control circuit 26. Further, in each embodiment, the correspondence relationship between input terminals of cross point switch 24 and data signals may be opposite to the above-described relationship. According to each configuration described above, a path within the cross point switch can be appropriately controlled based on a determination result from the rate determining unit.

The above description is directed to the case where an electrical signal output from receiving circuit 22 (PMD) is split into two signals to determine a transmission rate. However, an electrical signal output from the TIA may be split into two signals. A transmission rate can also be determined by applying the above-described methods to the two signals.

In the case where the data receiving apparatus is mounted on an optical line terminal, the optical line terminal controls a rate and a timing of arrival of burst signal sent from an optical network unit. In an embodiment of the present invention, a rate determining unit is provided on the data receiving apparatus. The rate determining unit, however, is not necessarily essential. The optical line terminal can control a path in the cross point switch (path switch) based on the information managed by the optical line terminal. Therefore, in the case where the data receiving apparatus according to this embodiment is mounted on OLT 2, a path in cross point switch 24 can be controlled in accordance with the information on timing of arrival and transmission rate of data signal sent from ONU 3, the information being managed by OLT 2.

Figure 10:
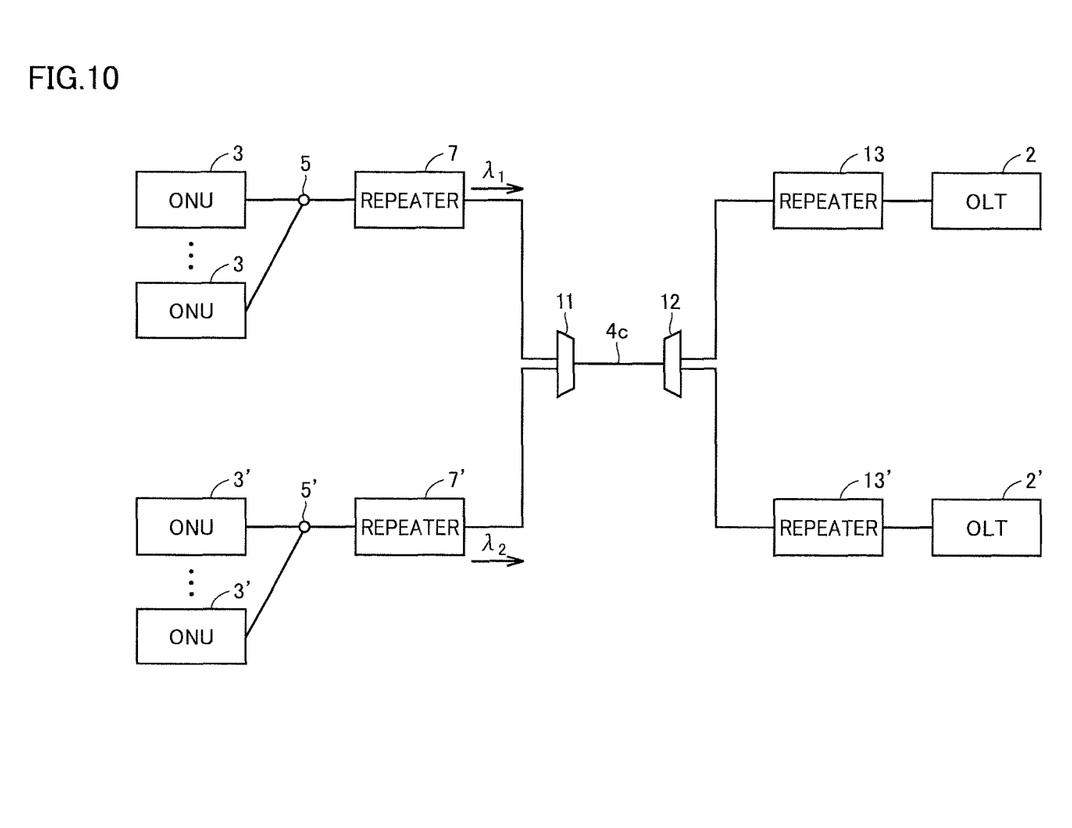
FIG. 10 is a diagram showing a configuration of a WDM (wavelength division multiplex) optical communications system according to an embodiment of the present invention.

FIG. 10 is a diagram showing a configuration of a WDM (wavelength division multiplex) optical communications system according to an embodiment of the present invention. In the following, a configuration and a method regarding transmission of signal from ONUs to OLTs are described. As shown in FIG. 10, a plurality of leaf line optical fibers connected to respective ONUs 3 are combined by optical coupler 5. A plurality of leaf line optical fibers connected to respective ONUs 3' are combined by optical coupler 5'. Optical coupler 5 is connected to optical signal repeater 7 with a trunk line optical fiber. Optical coupler 5' is connected to optical signal repeater 7' with another trunk line optical fiber.

Optical signal repeaters 7, 7' are connected to one optical fiber 4c through an optical wavelength division multiplexer/demultiplexer 11 and are connected to optical signal repeaters 13, 13', respectively, through an optical wavelength division multiplexer/demultiplexer 12. Optical signal repeaters 13, 13' are connected to OLTs 2, 2', respectively.

Optical signal repeater 7 receives an upstream optical signal sent from ONU 3 and outputs an optical signal having a wavelength $\lambda_1$. Optical signal repeater 7' receives an upstream optical signal sent from ONU 3' and outputs an optical signal having a wavelength $\lambda_2$. Optical wavelength division multiplexer/demultiplexer 11 sends an optical signal having wavelength $\lambda_1$ and an optical signal having wavelength $\lambda_2$ to optical fiber 4c by wavelength division multiplex. Optical wavelength division multiplexer/demultiplexer 12 splits the wavelength-division-multiplexed optical signal into an optical signal having wavelength $\lambda_1$ and an optical signal having wavelength $\lambda_2$. The optical signal having wavelength $\lambda_1$ is sent to optical signal repeater 13. The optical signal having wavelength $\lambda_2$ is sent to optical signal repeater 13'. Optical signal repeaters 13, 13' repeat the input optical signals. Optical signal repeaters 13, 13' convert a WDM wavelength for optical wavelength division multiplexer/demultiplexer 12 into a wavelength for upstream transmission of the 10GE-PON. OLTs 2, 2' receive the optical signals sent from optical signal repeaters 13, 13', respectively. The optical transceiver of each of OLTs 2, 2' may be equipped with an optical transceiver for wavelength division multiplexing transmission. Accordingly, OLTs 2, 2' can directly receive optical signals having wavelengths $\lambda_1$ and $\lambda_2$, respectively, output from optical wavelength division multiplexer/demultiplexer 12. Therefore, the configuration can be simplified. Each of an optical signal having wavelength $\lambda_1$ and an optical signal having wavelength $\lambda_2$ may include at least one of a 10G signal and a 1G signal.

The embodiments disclosed herein should be considered illustrative in every respect, not limitative. The scope of the present invention is defined not by the above-described embodiments but by the claims. It is intended that the scope of the present invention includes any modification within the scope and meaning equivalent to the scope of the claims.

REFERENCE SIGNS LIST

1: optical communications system; 2, 2': optical line terminal (OLT); 3, 3', 3a, 3b, 3c: optical network unit (ONU); 4a: trunk line optical fiber; 4b: leaf line optical fiber; 4c: optical fiber; 5, 5': optical coupler; 6a, 6b, 6c, 6'a, 6'b, 6'c: optical fiber; 7, 7', 13, 13': optical signal repeater; 11, 12: optical wavelength division multiplexer/demultiplexer; 20: host board; 21: optical transceiver; 22: receiving circuit; 24: cross point switch; 24a, 24b, 25a, 27a: input terminal; 24c, 24d: output terminal; 25: 1G signal receiving unit; 27: 10G signal receiving unit; 26: switch control circuit; 28: rate determining unit; 31: optical receiver; 32: transimpedance amplifier; 33, 33a, 34-37: limiting amplifier

The invention claimed is:
1. A data receiving apparatus comprising:
a data receiving circuit including:
a first receiving circuit configured to receive a first data signal transmitted at a first rate, and
a second receiving circuit configured to receive a second data signal transmitted at a second rate different from the first rate; and
a path switch including first and second input terminals and first and second output terminals, the path switch being configured to define a path of signal between at least one of the first and second input terminals and at least one of the first and second output terminals to route an input data signal in which the first rate and the second rate are mixed, to at least one of the first receiving circuit and the second receiving circuit.

2. The data receiving apparatus according to claim 1, the data receiving apparatus further comprising:
- a first limiting amplifier configured to extract the first data signal having the first rate from the input data signal;
- a second limiting amplifier configured to extract the second data signal having the second rate from the input data signal; and
- a control circuit configured to control the path in the path switch, wherein
- the first output terminal is a terminal to output the first data signal to the first receiving circuit,
- the second output terminal is a terminal to output the second data signal to the second receiving circuit,
- the control circuit is configured to control the path in the path switch in accordance with a mode selected from among a first mode, a second mode, and a third mode,
- the first mode is a mode in which the first input terminal and the first output terminal are connected to each other and in which the second input terminal and the second output terminal are connected to each other,
- the second mode is a mode in which any one of the first and second input terminals is connected to the first and second output terminals switchably, and
- the third mode is a mode in which any one of the first and second input terminals is connected to the first and second output terminals.

3. A data receiving apparatus comprising:
- a data receiving circuit including:
  - a first receiving circuit configured to receive a first data signal transmitted at a first rate, and
  - a second receiving circuit configured to receive a second data signal transmitted at a second rate different from the first rate; and
- a path switch including first and second input terminals and first and second output terminals, the path switch being configured to define a path of signal between at least one of the first and second input terminals and at least one of the first and second output terminals to route an input data signal to at least one of the first receiving circuit and the second receiving circuit, wherein
- the path in the path switch is set so that a terminal, among the first and second input terminals, receiving input of the data signal is connected to the first and second output terminals, and
- the data receiving apparatus further comprises a rate determining unit configured to determine a rate of transmission of the data signal based on whether or not the data signal has been successfully received by at least one of the first receiving circuit and the second receiving circuit.

4. The data receiving apparatus according to claim 3, wherein the data receiving apparatus is included in an optical line terminal of an optical communications system.

5. The data receiving apparatus according to claim 3, wherein the data receiving apparatus further comprising a control circuit configured to control the path in the path switch, wherein
- the first output terminal is a terminal to output the first data signal to the first receiving circuit,
- the second output terminal is a terminal to output the second data signal to the second receiving circuit,
- the control circuit is configured to control the path in the path switch in accordance with a mode selected from among a first mode, a second mode, and a third mode,
- the first mode is a mode in which the first input terminal and the first output terminal are connected to each other and in which the second input terminal and the second output terminal are connected to each other,
- the second mode is a mode in which any one of the first and second input terminals is connected to the first and second output terminals switchably, and
- the third mode is a mode in which any one of the first and second input terminals is connected to the first and second output terminals.

6. The data receiving apparatus according to claim 3, wherein the first receiving circuit performs locking and determination of the data signal when the data signal is input to the first receiving circuit, and
- the rate determining unit determines the rate of the data signal based on a result of the determination.

7. The data receiving apparatus according to claim 3, wherein the first receiving circuit includes a first CDR (Clock Data Recovery) circuit, the second receiving circuit includes a second CDR circuit, and
- the rate determining unit determines a transmission rate of a locked one of the first and second CDR circuits as the rate of the data signal.

8. The data receiving apparatus according to claim 7, wherein the rate determining unit further decodes the data signal, and determines the rate of the data signal based on a signal pattern of the decoded data signal.

9. The data receiving apparatus according to claim 3, wherein a first signal and a second signal are branched from the data signal, the first signal is passed through a low-pass filter (LPF) having a band intermediate between the first and second rates, the second signal is not passed through the LPF, and
- the rate determining unit determines the rate of the data signal based on a difference between a power of the first signal passed through the LPF and a power of the second signal not passed through the LPF.

10. A data receiving apparatus comprising:
- a data receiving circuit including:
  - a first receiving circuit configured to receive a first data signal transmitted at a first rate, and
  - a second receiving circuit configured to receive a second data signal transmitted at a second rate different from the first rate; and
- a path switch including first and second input terminals and first and second output terminals, the path switch being configured to define a path of signal between at least one of the first and second input terminals and at least one of the first and second output terminals to route an input data signal to at least one of the first receiving circuit and the second receiving circuit, wherein
- the path in the path switch is controlled so that a terminal, among the first and second input terminals, receiving input of the data signal is connected to the first and second output terminals switchably, and
- the data receiving apparatus further comprises a rate determining unit configured to determine a rate of transmission of the data signal based on whether or not the data signal has been successfully received by at least one of the first receiving circuit and the second receiving circuit.

11. The data receiving apparatus according to claim 10, wherein the data receiving apparatus further comprising a control circuit configured to control the path in the path switch, wherein
- the first output terminal is a terminal to output the first data signal to the first receiving circuit, the second output terminal is a terminal to output the second data signal to the second receiving circuit, the control circuit is configured to control the path in the path switch in accordance with a mode selected from among a first mode, a second mode, and a third mode, the first mode is a mode in which the first input terminal and the first output terminal are connected to each other and in which the second input terminal and the second output terminal are connected to each other, the second mode is a mode in which any one of the first and second input terminals is connected to the first and second output terminals switchably, and the third mode is a mode in which any one of the first and second input terminals is connected to the first and second output terminals.

12. The data receiving apparatus according to claim 10, wherein the data receiving apparatus is included in an optical line terminal of an optical communications system.

13. The data receiving apparatus according to claim 10, wherein the first receiving circuit performs locking and determination of the data signal when the data signal is input to the first receiving circuit, and the rate determining unit determines the rate of the data signal based on a result of the determination.

14. The data receiving apparatus according to claim 10, wherein the first receiving circuit includes a first CDR (Clock Data Recovery) circuit, the second receiving circuit includes a second CDR circuit, and the rate determining unit determines a transmission rate of a locked one of the first and second CDR circuits as the rate of the data signal.

15. The data receiving apparatus according to claim 14, wherein the rate determining unit further decodes the data signal, and determines the rate of the data signal based on a signal pattern of the decoded data signal.

16. The data receiving apparatus according to claim 10, wherein a first signal and a second signal are branched from the data signal, the first signal is passed through a low-pass filter (LPF) having a band intermediate between the first and second rates, the second signal is not passed through the LPF, and the rate determining unit determines the rate of the data signal based on a difference between a power of the first signal passed through the LPF and a power of the second signal not passed through the LPF.

* * * * *